(12) United States Patent
Chen et al.

(10) Patent No.: US 9,659,466 B1
(45) Date of Patent: May 23, 2017

(54) POS APPARATUS AND DISPLAY DEVICE

(71) Applicant: PENETEK TECHNOLOGY, INC., New Taipei (TW)

(72) Inventors: Tsung-Lung Chen, Taipei (TW); Hsin-Hung Chen, New Taipei (TW); Wen-Hsien Yu, Keelung (TW)

(73) Assignee: PENETEK TECHNOLOGY, INC., New Taipei (TW)

( * ) Notice: Subject to any disclaimer, the term of this patent is extended or adjusted under 35 U.S.C. 154(b) by 0 days.

(21) Appl. No.: 15/060,745

(22) Filed: Mar. 4, 2016

(51) Int. Cl.
| | |
|---|---|
| *H05K 7/20* | (2006.01) |
| *G07G 1/00* | (2006.01) |
| *G06Q 20/20* | (2012.01) |
| *H01L 23/473* | (2006.01) |

(52) U.S. Cl.
CPC ........... *G07G 1/0018* (2013.01); *G06Q 20/20* (2013.01)

(58) Field of Classification Search
CPC . G06F 1/181–1/182; H05K 7/20218–7/20381; H05K 7/20409–7/20418; H05K 7/20009–7/202; H01L 23/367–23/3677; H01L 23/473; H01L 23/46–23/467
USPC ...... 361/676–678, 679.46–679.54, 688–723; 165/80.1–80.5, 104.33, 185; 174/15.1–15.3, 16.1–16.3, 547, 548; 257/712–722, E23.088; 24/453, 458–459; 454/184; 312/236
See application file for complete search history.

(56) References Cited

U.S. PATENT DOCUMENTS

| | | | | |
|---|---|---|---|---|
| 2003/0184967 A1* | 10/2003 | Holalkere | ............... | G06F 1/203 361/679.46 |
| 2004/0264130 A1* | 12/2004 | Liang | ................... | G06F 1/1601 361/690 |
| 2005/0078446 A1* | 4/2005 | Bae | ........................ | G06F 1/1601 361/679.52 |
| 2006/0187644 A1* | 8/2006 | Jeong | ....................... | H05K 5/02 361/704 |
| 2006/0268510 A1* | 11/2006 | Jeong | ................. | H05K 7/20963 361/689 |
| 2006/0291153 A1* | 12/2006 | Bae | ....................... | G06F 1/1601 361/679.22 |

(Continued)

*Primary Examiner* — Anthony Haughton
*Assistant Examiner* — Razmeen Gafur
(74) *Attorney, Agent, or Firm* — Li & Cai Intellectual Property (USA) Office

(57) ABSTRACT

A display device includes a chassis, an electronic module, and a waterproof breathable member. The chassis has a front frame and a rear cover installed on the front frame. The rear cover has a plurality of heat-dissipating holes and an intake port, and the chassis is configured to allow a heat-dissipating airflow to pass through the accommodating space via the heat-dissipating holes and the intake port. The electronic module arranged in the chassis has a circuit board, and the heat-dissipating holes are arranged above the circuit board. The waterproof breathable member is disposed on an inner surface of the rear cover and entirely shields the heat-dissipating holes, so the heat-dissipating airflow only passes through the waterproof breathable member when the heat-dissipating airflow flows out of the chassis via the heat-dissipating holes. The waterproof breathable member is configured to avoid any liquid flowing into the chassis via the heat-dissipating holes.

10 Claims, 7 Drawing Sheets

(56) References Cited

U.S. PATENT DOCUMENTS

| | | | |
|---|---|---|---|
| 2007/0103045 A1* | 5/2007 | Shin | H05K 7/20963 313/44 |
| 2008/0068806 A1* | 3/2008 | Han | H05K 7/20963 361/714 |
| 2008/0259556 A1* | 10/2008 | Tracy | G06F 1/1632 361/679.49 |
| 2009/0296353 A1* | 12/2009 | Kim | H05K 7/20963 361/711 |
| 2010/0079942 A1* | 4/2010 | Yamamoto | G02F 1/133308 361/690 |
| 2010/0079954 A1* | 4/2010 | Nakamichi | G02F 1/133308 361/701 |
| 2011/0051369 A1* | 3/2011 | Takahara | H05K 7/2099 361/696 |
| 2012/0002368 A1* | 1/2012 | Broili | F04D 17/04 361/679.48 |
| 2012/0045086 A1* | 2/2012 | Su | G06F 1/1643 381/388 |
| 2012/0188724 A1* | 7/2012 | Masaki | G06F 1/1601 361/720 |
| 2013/0016473 A1* | 1/2013 | Ito | B08B 1/00 361/679.54 |
| 2013/0070159 A1* | 3/2013 | Ooe | H04N 5/655 348/725 |
| 2013/0070172 A1* | 3/2013 | Ooe | H04N 5/64 348/843 |
| 2013/0223007 A1* | 8/2013 | Nakajima | H05K 7/20336 361/697 |
| 2014/0002750 A1* | 1/2014 | Hamada | H05K 7/202 348/725 |
| 2014/0055953 A1* | 2/2014 | Fujiwara | H05K 7/20336 361/695 |
| 2014/0160674 A1* | 6/2014 | Yamakita | G09F 9/00 361/679.54 |
| 2014/0347811 A1* | 11/2014 | Yu | G06F 1/203 361/679.54 |
| 2015/0168995 A1* | 6/2015 | Jeon | G06F 1/1637 361/679.22 |

* cited by examiner

POS APPARATUS AND DISPLAY DEVICE

BACKGROUND OF THE INVENTION

1. Field of the Invention

The instant invention relates to a POS apparatus; in particular, to a POS (point of sale) apparatus and a display device each having waterproof function.

2. Description of Related Art

Conventional POS apparatus include a display device for providing signal input function to a user, and a plurality of holes are formed on a rear cover of the display device to dissipate heat, which is generated by the display device.

However, the rear cover of the display device of the conventional POS apparatus needs to face towards each consumer, such that the holes of the rear cover are close to each consumer. Accordingly, if a consumer does not pay attention, causing liquid to flow into the display device of the conventional POS apparatus via the holes of the rear cover (e.g., the consumer is collided by another person to spill his/her beverage), the electronic parts of the display device are easily harmed.

SUMMARY OF THE INVENTION

The instant disclosure provides a POS apparatus and a display device for effectively solving the problem generated by the conventional POS apparatus.

The instant disclosure provides a POS apparatus, comprising: a display device, comprising: a chassis having a front frame and a rear cover detachably installed on the front frame, the front frame and the rear cover surroundingly defining an accommodating space, wherein the rear cover has a plurality of heat-dissipating holes and an intake port, and the chassis is configured to allow a heat-dissipating airflow to pass through the accommodating space from the intake port to the heat-dissipating holes; an electronic module has a circuit board and a plurality of electronic parts mounted on the circuit board, wherein the circuit board and the electronic parts are arranged in the accommodating space, and the heat-dissipating holes are arranged above the circuit board; and a waterproof breathable member disposed on an inner surface of the rear cover and arranged in the accommodating space, wherein the waterproof breathable member entirely shields the heat-dissipating holes, so the heat-dissipating airflow only passes through the waterproof breathable member when the heat-dissipating airflow flows out of the chassis via the heat-dissipating holes; wherein the waterproof breathable member is configured to avoid any liquid flowing into the chassis via the heat-dissipating holes; and a support mounted on the rear cover of the chassis for disposing on a working surface, wherein the heat-dissipating holes of the display device is provided for facing towards a consumer.

The instant disclosure also provides a display device, comprising: a chassis having a front frame and a rear cover detachably installed on the front frame, the front frame and the rear cover surroundingly defining an accommodating space, wherein the rear cover has a plurality of heat-dissipating holes and an intake port, and the chassis is configured to allow a heat-dissipating airflow to pass through the accommodating space from the intake port to the heat-dissipating holes; an electronic module has a circuit board and a plurality of electronic parts mounted on the circuit board, wherein the circuit board and the electronic parts are arranged in the accommodating space, and the heat-dissipating holes are arranged above the circuit board; and a waterproof breathable member disposed on an inner surface of the rear cover and arranged in the accommodating space, wherein the waterproof breathable member entirely shields the heat-dissipating holes, so the heat-dissipating airflow only passes through the waterproof breathable member when the heat-dissipating airflow flows out of the chassis via the heat-dissipating holes; wherein the waterproof breathable member is configured to avoid any liquid flowing into the chassis via the heat-dissipating holes.

Preferably, the rear cover has a ring-shaped groove recessed on the inner surface thereof, the display device has a heat-resisting gel filled in the groove, and the heat-resisting gel is adhered to the waterproof breathable member; an edge portion of the waterproof breathable member adhered to the heat-resisting gel encloses a portion of the waterproof breathable member shielding the heat-dissipating holes.

In summary, the POS apparatus and display device in the instant disclosure is provided with a waterproof breathable member, which is corresponding in position to the heat-dissipating holes of the chassis and does not influence the regular operation of the display device, thereby preventing the electronic module from being harmed by liquid flowing into the chassis via the heat-dissipating holes.

In order to further appreciate the characteristics and technical contents of the instant invention, references are hereunder made to the detailed descriptions and appended drawings in connection with the instant invention. However, the appended drawings are merely shown for exemplary purposes, rather than being used to restrict the scope of the instant invention.

DETAILED DESCRIPTION OF THE PREFERRED EMBODIMENTS

Please refer to FIGS. 1 through 6, which show an embodiment of the instant disclosure. References are hereunder made to the detailed descriptions and appended drawings in connection with the instant invention. However, the appended drawings are merely shown for exemplary purposes, rather than being used to restrict the scope of the instant invention.

Figure 1:
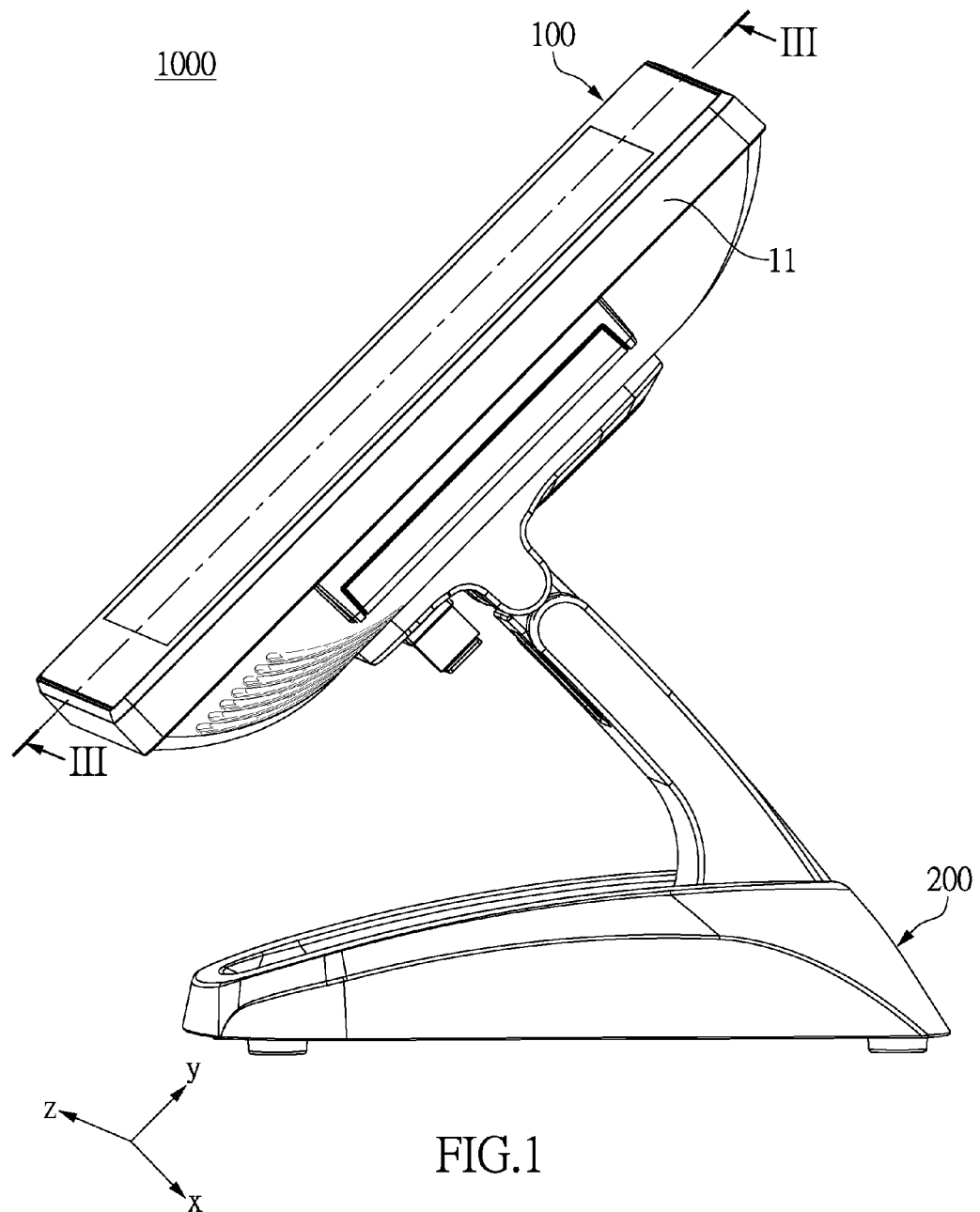
FIG. 1 is a perspective view showing a POS apparatus according to the instant disclosure.
Figure 2:
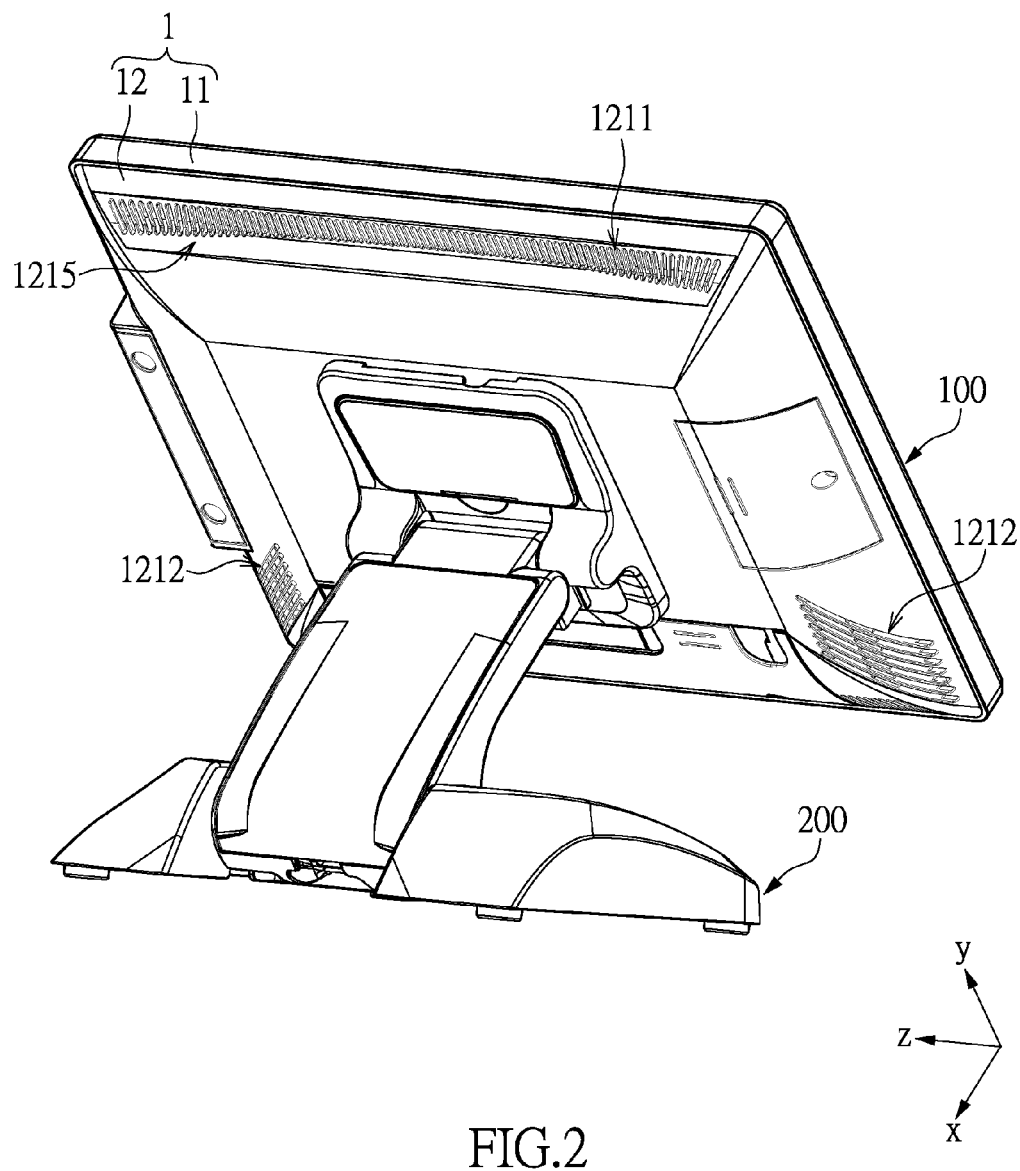
FIG. 2 is a perspective view of FIG. 1 from another perspective.

As shown in FIGS. 1 and 2, the instant embodiment provides a POS (point of sale) apparatus 1000, the front side of the POS apparatus 1000 (as shown in FIG. 1) is provided for facing toward a user, and the rear side of the POS apparatus 1000 (as shown in FIG. 2) is provided close to a consumer. The POS apparatus 1000 comprises a display device 100 and a support 200 mounted on the display device 100, and the display device 100 in the instant embodiment is an all-in-one touch-control computer, but is not limited thereto.

The support 200 is pivotally connected to a rear side of the display device 100 (i.e., a rear cover 12) for disposing on a working surface (e.g., wall or desktop), such that the display device 100 can be located at a suitable position or angle for a user by adjusting the support 200. For example, an angle between the display device 100 and the working surface can be 30~60 degrees by rotating the support 200, thereby providing convenient operation for the user, but it is not limited thereto.

Figure 3:
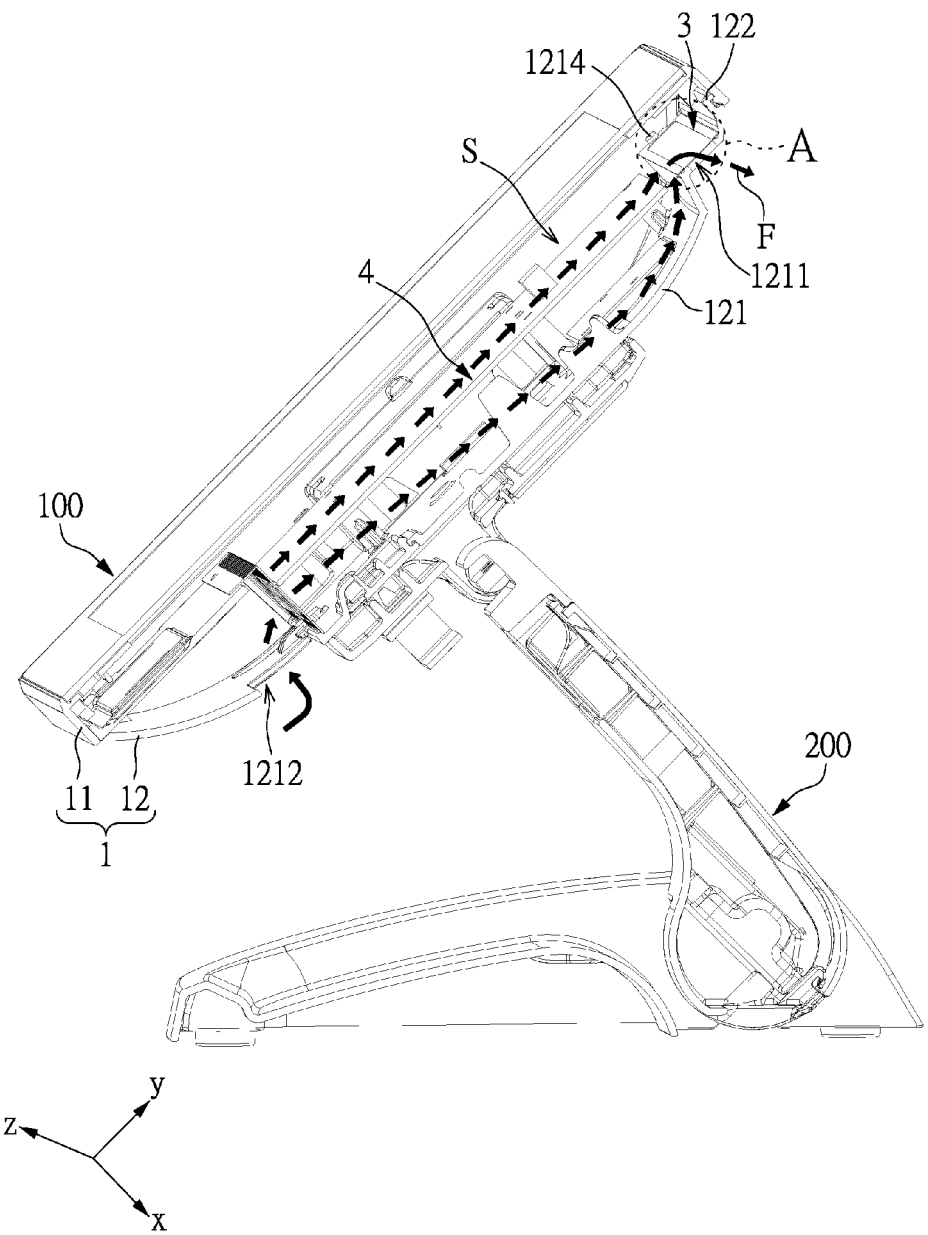
FIG. 3 is a cross-sectional view of FIG. 1 along a cross-sectional line III-III.
Figure 4:
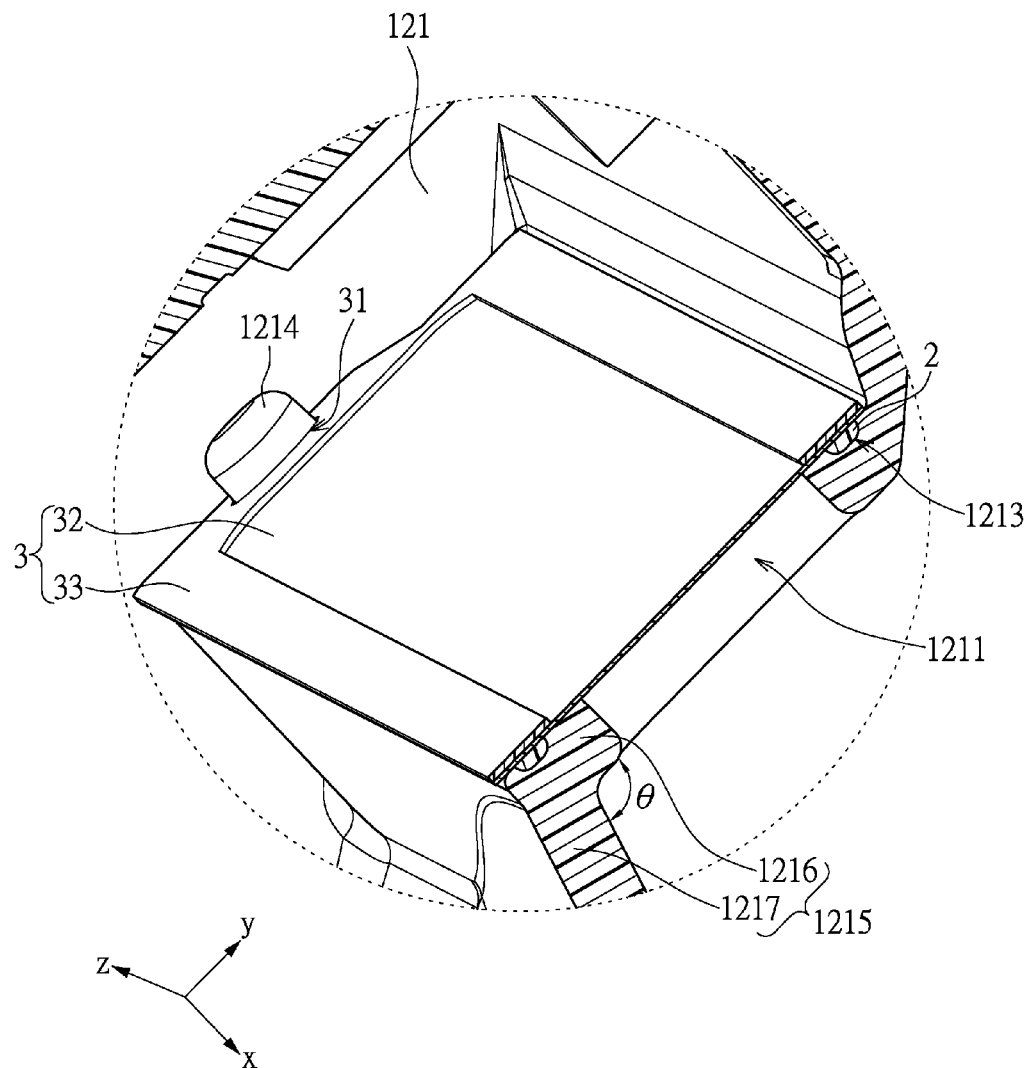
FIG. 4 is an enlarged view showing the portion A of FIG. 3.

As shown in FIGS. 3 and 4, the display device 100 includes a chassis 1, a heat-resisting gel 2, a waterproof breathable member 3, and an electronic module 4. The electronic module 4 and the waterproof breathable member 3 are arranged in an accommodating space S defined by the chassis 1. For the display device 100, the instant embodiment only discloses the chassis 1, the heat-resisting gel 2, the waterproof breathable member 3, and the electronic module 4, and the other components (e.g., display module) are not disclosed in the instant embodiment. The following description discloses the construction of the chassis 1, the heat-resisting gel 2, the waterproof breathable member 3, and the electronic module 4, and then discloses the relationship between the above components.

Figure 5:
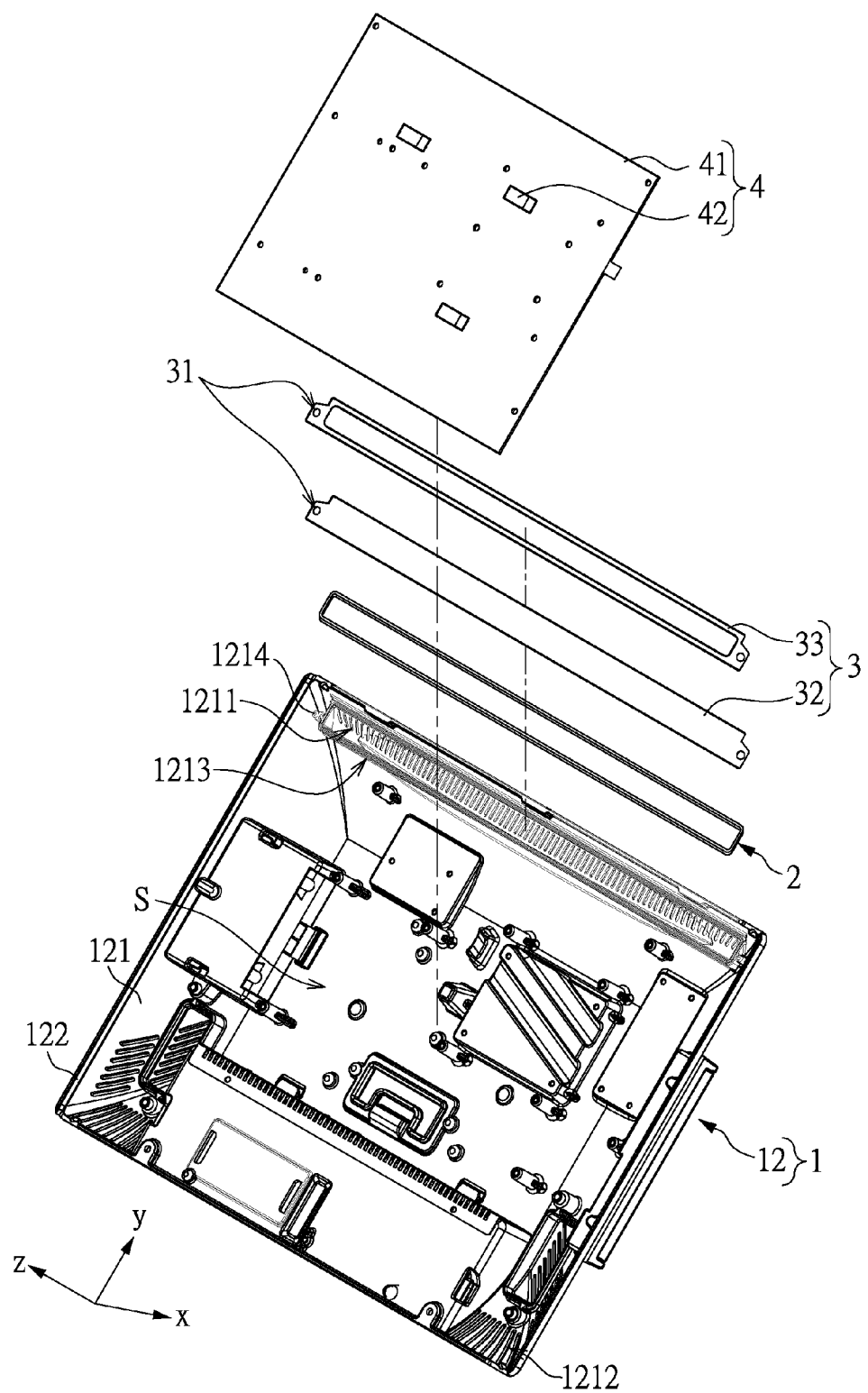
FIG. 5 is an exploded view of FIG. 1.
Figure 6:
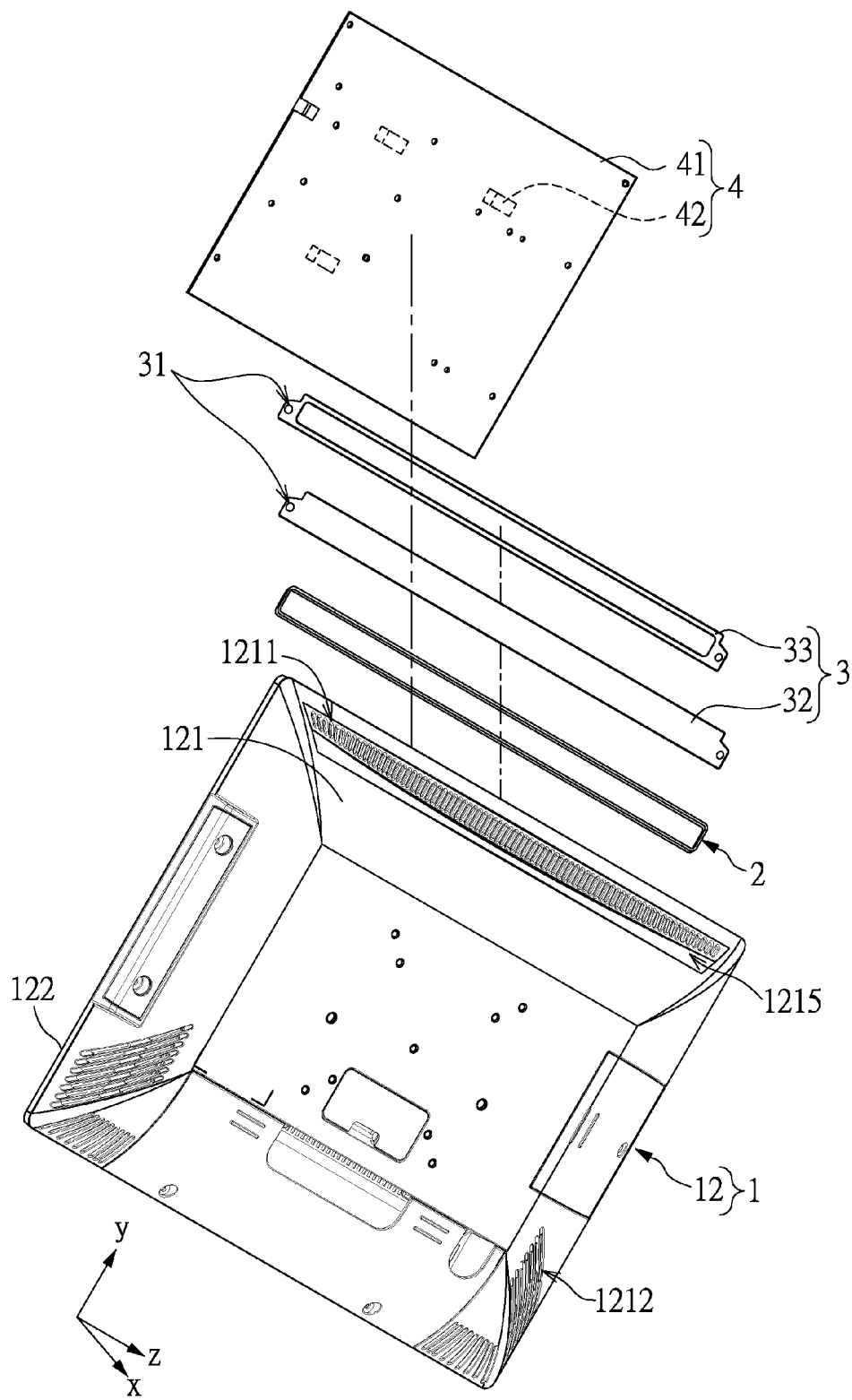
FIG. 6 is an exploded view of FIG. 2.

Please refer to FIGS. 3 and 4, with reference occasionally made to FIGS. 5 and 6. The chassis 1 includes a front frame 11 and a rear cover 12 detachably installed on the front frame 11. The edges of the front frame 11 define a X axis, a Y axis, and a Z axis for clearly showing the orientation of each figure, and the X axis, the Y axis, and the Z axis are perpendicular to each other. The rear cover 12 has a plurality of heat-dissipating holes 1211 and a plurality of intake ports 1212. The chassis 1 is configured to allow a heat-dissipating airflow F to pass through the accommodating space S and the electronic module 4 from the intake ports 1212 to the heat-dissipating holes 1211. The heat-dissipating holes 1211 of the display device 100 are provided for facing toward a consumer (not shown), so the construction of the display device 100 needs to take care that a consumer, not paying attention, may cause liquid to flow into the chassis 1 via heat-dissipating holes 1211. Moreover, the rear cover 12 has a rectangular-ring-shaped groove 1213 recessed on an inner surface of a top portion thereof, and the groove 1213 is approximately arranged around the heat-dissipating holes 1211. The rear cover 12 has two positioning pillars 1214 arranged at two opposite sides of the groove 1213 (i.e., the left side and the right side of the groove 1213 shown in FIG. 5).

The number or shape of the heat-dissipating holes 1211, the intake ports 1212, or the positioning pillars 1214 can be changed according to a designer's demand. For example, the top portion of the rear cover 12 can be provided with a single heat-dissipating hole 1211 (not shown) or a plurality of heat-dissipating holes 1211 arranged in one row (as shown in FIG. 5).

Specifically, the rear cover 12 includes a rear plate 121 having an arc shape and a surrounding plate 122 connected to the edge of the rear plate 121. The surrounding plate 122 is integrally extended from the edge of the rear plate 121 and is installed on the edge of the front frame 11. The rear plate 121 has a trough 1215 recessed on an outer surface of the top portion thereof. The trough 1215 is formed by inwardly arranging a first portion 1216 of the rear plate 121 and a second portion 1217 of the rear plate 121. The second portion 1217 is integrally extended from the first portion 1216 at an angle Θ, and the angle Θ is greater than or identical to 90 degrees.

Moreover, in the instant embodiment, the heat-dissipating holes 1211 are penetratingly formed on the first portion 1216 of the trough 1215, the groove 1213 is formed on the inner surface of the trough 1215, a top surface of the groove 1213 is a rectangular-ring-shaped plane, the positioning pillars 1214 are integrally extended from the inner surface of the rear plate 121 and are arranged in a space surrounded by the rear cover 12.

The waterproof breathable member 3 in the instant embodiment is a waterproof breathable cloth. The waterproof breathable member 3 is disposed on the inner surface of the rear cover 12 and entirely shields the heat-dissipating holes 1211 (i.e., the waterproof breathable member 3 is located at a traveling path of the heat-dissipating airflow F corresponding to the heat-dissipating holes 1211). The waterproof breathable member 3 in the instant embodiment has two thru-holes 31, and the two positioning pillars 1214 of the rear cover 12 are respectively inserted into the two thru-holes 31 of the waterproof breathable member 3, thereby positioning the waterproof breathable member 3. The heat-resisting gel 2 is filled in the groove 1213 and is adhered to the waterproof breathable member 3, so the waterproof breathable member 3 is adhered to the inner surface of the rear cover 12. In other words, the position of the waterproof breathable member 3 is corresponding to the first portion 1216 of the trough 1215. Specifically, an edge portion of the waterproof breathable member 3 is adhered to the heat-resisting gel 2 enclosing a portion of the waterproof breathable member 3 shielding the heat-dissipating holes 1211. Thus, when the heat-dissipating airflow F flows out of the chassis 1 via the heat-dissipating holes 1211, the heat-dissipating airflow F only passes through the waterproof breathable member 3, so the waterproof breathable member 3 can be configured to avoid any liquid (not shown) flowing into the chassis 1 via the heat-dissipating holes 1211.

Moreover, in the instant embodiment, the heat-resisting gel 2 is a silicone gel, the melting temperature of the heat-resisting gel 2 is about 160° C., and the heat-resistant temperature of the heat-resisting gel 2 is about 130° C. The waterproof breathable member 3 has a non-woven fabric 32 and a ring-shaped strengthening sheet 33 fixed on a periphery of the non-woven fabric 32. The strengthening sheet 33 is a plastic sheet and is provided for maintaining an unfolding shape of the non-woven fabric 32. The heat-resisting gel 2 is adhered to the non-woven fabric 32, and the strengthening sheet 33 is arranged at a side of the non-woven fabric 32 opposing to the heat-resisting gel 2. The non-woven fabric 32 is preferably provided with a condition: a heat-dissipating rate of the display device 100 is approximately 90~99% of a heat-dissipating rate of the display device 100 provided without the waterproof breathable member 3, but the instant disclosure is not limited to this condition.

In addition, the waterproof breathable member 3 in the instant embodiment is adhered to the rear cover 12 by using the heat-resisting gel 2, but is not limited thereto. In a non-shown embodiment, a waterproof gasket is arranged in the groove 1213, an edge of the waterproof breathable member 3 is abutted against the waterproof gasket, and a fixing component presses the edge of the waterproof breathable member 3 and is fixed on the chassis 1, thereby the waterproof gasket and the edge of the waterproof breathable member 3 are pressed by the fixing component and the chassis 1 to achieve a waterproof function.

The electronic module 4 includes a circuit board 41 and a plurality of electronic parts 42 mounted on the circuit board 41. The circuit board 41 and the electronic parts 42 are arranged in the accommodating space S, the heat-dissipating holes 1211 of the chassis 1 are arranged above the circuit board 41. The first portion 1216 is approximately parallel to the circuit board 41, and the intake ports 1212 are corresponding in position to the bottom portion of the circuit board 41. In other words, the electronic module 4 is arranged in the traveling path of the heat-dissipating airflow F, such that heat generated from the electronic module 4 can be dissipated by the heat-dissipating airflow F. Specifically, the circuit board 41 is arranged in a space surrounded by the rear plate 121, and the waterproof breathable member 3 is approximately coplanar with the circuit board 41. Moreover, a length of the groove 1213 is greater than that of the circuit board 41.

In summary, the POS apparatus 1000 in the instant embodiment is provided with a waterproof breathable member 3, which is corresponding in position to the heat-dissipating holes 1211 of the chassis 1 and does not influence the regular operation of the display device 100, thereby preventing the electronic module 4 from begin harmed by liquid flowing into the chassis 1 via the heat-dissipating holes 1211. Moreover, the shape of the adhering area between the waterproof breathable member 3 and the heat-resisting gel 2 is an enclosed ring for effectively avoiding liquid flowing into the chassis 1 via the heat-dissipating holes 1211.

It should be noted that if the display device 100 is provided without any heat-dissipating fan, the display device 100 still has enough of a heat-dissipating rate, even if a portion of the chassis 1 corresponding to the intake ports 1212 is not provided with any waterproof breathable member 3. Specifically, for the practical use of the POS apparatus 1000, liquid almost does not flow into the chassis 1 via the intake ports 1212, and even if liquid flows into the chassis 1 via the intake ports 1212, the liquid will flow downwardly along the inner surface of the chassis 1 by gravitational force, so the liquid does not touch the electronic module 4. Accordingly, the portion of the chassis 1 corresponding to the intake ports 1212 in the instant embodiment can be provided without any waterproof breathable member 3.

Moreover, the display device 100 provided without the waterproof breathable member 3 (e.g., a conventional display device) has the heat-dissipating rate for 100% load operation, but a regular load operation of the display device 100 is usually 40~60% (at most 80%). Thus, when the waterproof breathable member 3 entirely shields the heat-dissipating holes 1211 of the chassis 1, the heat-dissipating rate of the display device 100 of the instant disclosure does not influence the regular operation of the display device 100.

Figure 7:
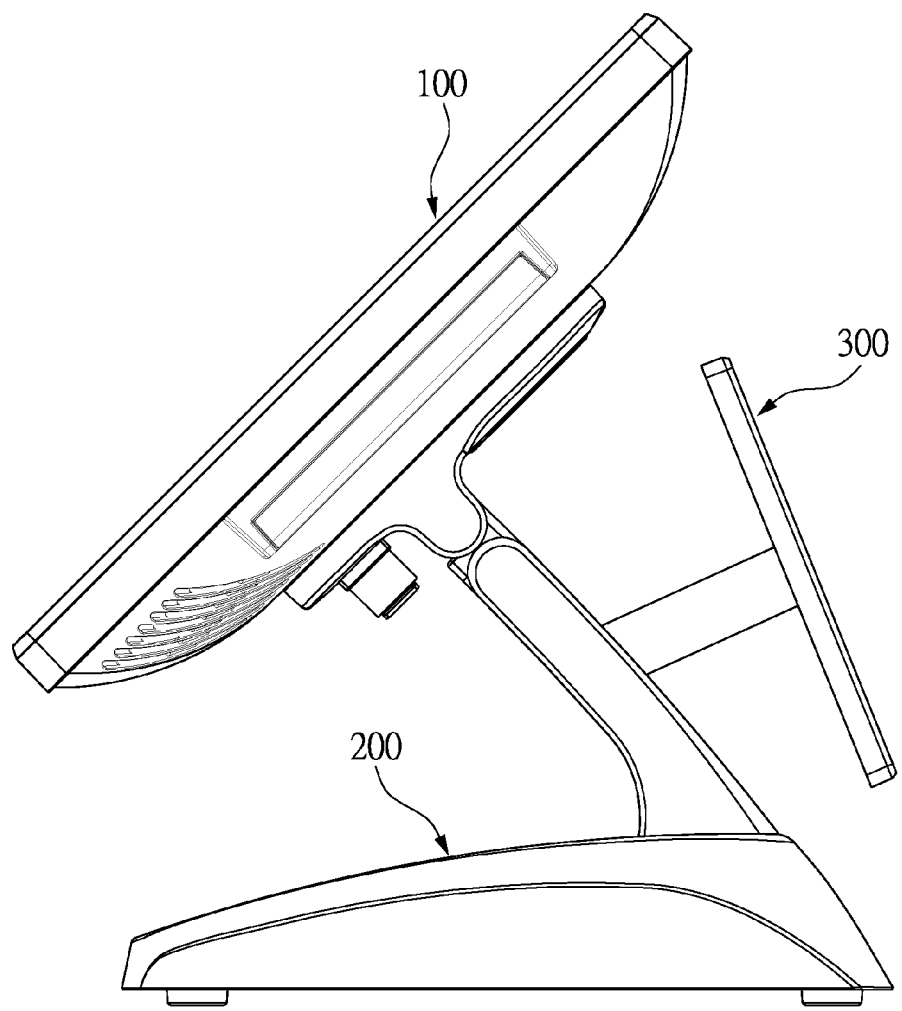
FIG. 7 is a perspective view showing a POS apparatus according to the other embodiment of the instant disclosure.

In addition, the construction of the POS apparatus 1000 can be changed according to a designer's demand, and is not limited to the construction as shown in FIGS. 1 and 2. For example, as shown in FIG. 7, the POS apparatus 1000 further comprises a screen 300 fixed on the support 200, the screen 300 and the display device 100 are respectively arranged to face toward two opposite directions (i.e., the screen 300 faces toward a right side and the display device 100 faces toward a left side) for providing for a consumer to watch the screen 300.

[The Possible Effect of the Instant Disclosure]

In summary, the POS apparatus in the instant embodiment is provided with the waterproof breathable member, which is corresponding in position to the heat-dissipating holes of the chassis and does not influence the regular operation of the display device, thereby preventing the electronic module from being harmed by liquid flowing into the chassis via the heat-dissipating holes. Moreover, the shape of the adhering area between the waterproof breathable member and the heat-resisting gel is an enclosed ring for effectively avoiding liquid flowing into the chassis via the heat-dissipating holes.

The descriptions illustrated supra set forth simply the preferred embodiments of the instant invention; however, the characteristics of the instant invention are by no means restricted thereto. All changes, alterations, or modifications conveniently considered by those skilled in the art are deemed to be encompassed within the scope of the instant invention delineated by the following claims.

What is claimed is:

1. A POS (point of sale) apparatus, comprising:
    a display device, comprising:
        a chassis having a front frame and a rear cover detachably installed on the front frame, the front frame and the rear cover surroundingly defining an accommodating space, wherein the rear cover has a plurality of heat-dissipating holes and an intake port, and the chassis is configured to allow a heat-dissipating airflow to pass through the accommodating space from the intake port to the heat-dissipating holes;
        an electronic module has a circuit board and a plurality of electronic parts mounted on the circuit board, wherein the circuit board and the electronic parts are arranged in the accommodating space, and the heat-dissipating holes is arranged above the circuit board; and
        a waterproof breathable member disposed on an inner surface of the rear cover and arranged in the accommodating space, wherein the waterproof breathable member entirely shields the heat-dissipating holes, so the heat-dissipating airflow only passes through the waterproof breathable member when the heat-dissipating airflow flows out of the chassis via the heat-dissipating holes; wherein the waterproof breathable member is configured to avoid any liquid flowing into the chassis via the heat-dissipating holes; and
    a support mounted on the rear cover of the chassis for disposing on a working surface, wherein the heat-dissipating holes of the display device is provided for facing toward a consumer.

2. The POS apparatus as claimed in claim 1, wherein the rear cover has a ring-shaped groove recessed on the inner surface thereof, the display device has a heat-resisting gel filled in the groove, and the heat-resisting gel is adhered to the waterproof breathable member; an edge portion of the waterproof breathable member is adhered to the heat-resisting gel and encloses a portion of the waterproof breathable member shielding the heat-dissipating holes.

3. The POS apparatus as claimed in claim 2, wherein the rear cover has two positioning pillars arranged outside the groove, the waterproof breathable member has two thru-holes, the two positioning pillars are respectively inserted into the two thru-holes, and the waterproof breathable member is approximately coplanar with the circuit board.

4. The POS apparatus as claimed in claim 2, wherein the waterproof breathable member has a non-woven fabric and a strengthening sheet fixed on a periphery portion of the non-woven fabric, the heat-resisting gel is adhered to the non-woven fabric, the strengthening sheet is arranged at a side of the non-woven fabric opposing to the heat-resisting gel, and a heat-dissipating rate of the display device is approximately 90~99% of a heat-dissipating rate of a display device provided without the waterproof breathable member.

5. The POS apparatus as claimed in claim 1, further comprising a screen fixed on the support, wherein the screen and the display device are respectively arranged to face toward two opposite directions for providing a consumer to watch the screen.

6. A display device, comprising:
   a chassis having a front frame and a rear cover detachably installed on the front frame, the front frame and the rear cover surroundingly defining an accommodating space, wherein the rear cover has a plurality of heat-dissipating holes and an intake port, and the chassis is configured to allow a heat-dissipating airflow to pass through the accommodating space from the intake port to the heat-dissipating holes;
   an electronic module has a circuit board and a plurality of electronic parts mounted on the circuit board, wherein the circuit board and the electronic parts are arranged in the accommodating space, and the heat-dissipating holes are arranged above the circuit board; and
   a waterproof breathable member disposed on an inner surface of the rear cover and arranged in the accommodating space, wherein the waterproof breathable member entirely shields the heat-dissipating holes, so the heat-dissipating airflow only passes through the waterproof breathable member when the heat-dissipating airflow flows out of the chassis via the heat-dissipating holes; wherein the waterproof breathable member is configured to avoid any liquid flowing into the chassis via the heat-dissipating holes.

7. The display device as claimed in claim 6, wherein the rear cover has a ring-shaped groove recessed on the inner surface thereof, the display device has a heat-resisting gel filled in the groove, and the heat-resisting gel is adhered to the waterproof breathable member; an edge portion of the waterproof breathable member is adhered to the heat-resisting gel and encloses a portion of the waterproof breathable member shielding the heat-dissipating holes.

8. The display device as claimed in claim 7, wherein the rear cover has two positioning pillars arranged outside the groove, the waterproof breathable member has two thru-holes, the two positioning pillars are respectively inserted into the two thru-holes, and the waterproof breathable member is approximately coplanar with the circuit board.

9. The display device as claimed in claim 7, wherein the waterproof breathable member has a non-woven fabric and a strengthening sheet fixed on a periphery portion of the non-woven fabric, the heat-resisting gel is adhered to the non-woven fabric, the strengthening sheet is arranged at a side of the non-woven fabric opposing to the heat-resisting gel, and a heat-dissipating rate of the display device is approximately 90~99% of a heat-dissipating rate of a display device provided without the waterproof breathable member.

10. The display device as claimed in claim 6, wherein the rear cover has a rear plate and a surrounding plate integrally connected to an edge of the rear plate, the surrounding plate is installed on the front frame, the rear plate has a trough recessed on an outer surface thereof; the trough is formed by inwardly arranging a first portion of the rear plate and a second portion of the rear plate, the second portion is extended from the first portion at an angle, and the angle is greater than or identical to 90 degrees, the heat-dissipating holes are penetratingly formed on the first portion, the circuit board is arranged in a space surrounded by the rear plate.

* * * * *